United States Patent Office 3,445,224
Patented May 20, 1969

3,445,224
PREPARATION OF IMAGED OFFSET MASTER
Frederick O. Bach, Villa Park, and Ruth E. Ormsbee, River Forest, Ill., assignors to A. B. Dick Company, Niles, Ill., a corporation of Illinois
No Drawing. Filed Apr. 19, 1965, Ser. No. 449,292
Int. Cl. G03g 5/02
U.S. Cl. 96—1        8 Claims

ABSTRACT OF THE DISCLOSURE

Preparation of an imaged lithographic plate from an electrophotographic master formed with a coating of zinc oxide in a water insoluble, water repellent binder by treatment of the surface, after imaging, with an aqueous solution of a salt or zirconium or titanium.

---

This invention relates to the preparation of an imaged offset master and more particularly to a process for the preparation of an imaged lithographic master embodying a coating capable of being imaged by the electrophotographic process.

This invention will be dercribed with reference to a master formed of an electrophotographic coating on a suitable base sheet and on which an image can be formed by conventional electrophotographic technique. It will be understood that concepts of this invention will have application to base sheets having a coating of a similar composition on which an ink receptive, water repellent image can be produced by techniques other than by electrophotographic processes and from which a corresponding imaged lithographic master can be formed.

An electrophotographic coating for use in the production of copy by electrostatic technique, as in the Electrofax process of RCA, comprises the combination of a suitable zinc oxide suspended in finely divided form in a resinous binder in a ratio of about 2 to 8 parts by weight of the zinc oxide per one part by weight of the binder.

Zinc oxides which are suitable for use in such electrophotographic coatings are those which are substantially electrically non-conductive in the dark. When exposed to light, they should have a surface photoconductivity of a certain level in order to be of practical use in the electrophotographic copy process. In testing zinc oxides to determine their suitability, it is convenient to express the results of the measurement of the test as surface photoconductivity because substantially all of the light is absorbed within the thin layer at the surface of the zinc oxide. To be useful as a component in the electrophotographic coating, the zinc oxide should have a surface photoconductivity of at least $10^{-9}$ ohm$^{-1}$/square/watt/cm.$^2$ when exposed to a wave length of about 3900 A.

Zinc oxides suitable for such electrophotographic coatings include Florence Green Seal No. 8 marketed by the New Jersey Zinc Company, Palmerton, Pa.; U.S.P. XIV marketed by Mallinckrodt Chemical Works, New York, N.Y.; U.S.P. zinc oxide marketed by Eagle-Picher Sales Company, Philadelphia, Pa., and Cat. No. Z-53 marketed by Fischer Scientific Company, Division of Eimer and Amend Company, New York, N.Y.

As the resinous binder, it is desirable to make use of a synthetic resinous material having a relatively high dielectric constant and high dielectric strength such as a styrenated alkyd resin, polyvinyl acetate (Patent No. 2,811,465), copolymers of vinyl chloride-vinyl acetate; polystyrene, butadiene-styrene, polystyrene copolymers (Patent No. 2,987,395); silicones (Patent No. 3,052,539, Patent No. 2,735,785, Patent No. 3,001,872); polyester alkyd resins, and the like, or other film forming materials such as cellulose ethers and esters, natural resins such as shellac, waxes and the like.

Characteristic of the described film forming binders of the type described is the fact that such materials are highly hydrophobic thereby to form a coating with the zinc oxide which presents a highly water repellent and ink receptive surface to render such surface incapable of use as the ink repellent, water receptive, non-imaged portions of an imaged lithographic plate. In the attempt to make use of base sheets coated with the described electrophotographic coating and imaged by electrophotographic technique as a lithographic duplicating master from which multiple copies can be produced, strong acidic etches have been applied to the non-imaged portions of the plate for conversion of said non-imaged portions of the coating from a hydrophobic to a hydrophilic surface.

Such strong acid etches are formulated of extremely toxic materials. Great care is required in their application to avoid blinding of the image. Considerable care is required to be practiced in their application to avoid scum formation in the non-imaged areas during the duplicating process and such strong acidic materials often lead to toning in the background.

It is an object of this invention to provide a method and means for conversion of such imaged coatings of zinc oxide and resinous binder whereby the conversion to render the non-imaged portions more hydrophilic by comparison with the imaged portion can be achieved in a simple and efficient manner and which does not embody the drawbacks heretofore described; which does not rely upon the use of a highly acidic system; which does not embody highly toxic components; which does not require any exceptional skills for application or use, and which is effective to render the non-imaged portions water receptive and ink repellent without noticeably interfering with the ink receptivity and water repellency of the image that has been formed on the surface of the coating.

The important concept of this invention resides in the discovery that, when the coating of zinc oxide and resinous binder, having an ink receptive, water repellent image thereon, is wash coated or wet with a dilute solution containing ions of zirconium and/or titanium, as in the form of water soluble salts of zirconium and/or titanium, the non-imaged portions of the coating are rendered water receptive and ink repellent while the imaged portions remain water repellent and ink receptive. Thus the treated plate can thereafter be mounted onto a lithographic press for use in the production of multiple copies by conventional lithographic technique.

As the source of zirconium and/or titanium ions, use can be made of an aqueous solution of water soluble salts of zirconium and/or titanium. Representative of such salts are zirconium sulfate, zirconium nitrate, zirconium acetate, zirconium hydroxy chloride, zirconium hydroxy nitrate, zirconium lactate, zirconium chloride, zirconium tetraacetyl acetonate and the corresponding titanium salts such as titanium sulfate, titanium acetate, titanium lactate, titanium chloride, etc. and ammonium zirconyl carbonate and the like ionizable zirconium and titanium metal salts. When applied as a wash coat or otherwise applied as by means of a spray coat, dip coat, roller coat or the like to wet the surfaces of the coating, it is desirable to make use of the metal salt in dilute solution in aqueous medium of more than 0.1% by weight of metal salt but it is undesirable to make use of an amount greater than 5–10% by weight. In the preferred practice, the conversion solution is formulated to contain an amount within the range of 0.5 to 4% by weight of the metal salt dissolved in aqueous medium.

It is believed that the reaction of the zirconium and/or titanium ion to convert the surface to one that is more water receptive and ink repellent is by way of the zinc oxide rather than the binder whereby the zinc oxide in the exposed, non-imaged portion of the coating is available for reaction while the imaged portion remains ink receptive and water repellent. The foregoing, which may offer an explanation for the selective reactivity of the non-imaged portion by comparison with the imaged portion of the surface, is not submitted as limited in character since other phenomena may be controlling in the conversion which takes place in the non-imaged portions of the plate while the imaged portions remain ink receptive and water repellent.

Having described the basic concepts of the invention, illustration will now be made of the practice of the invention in the production of a duplicating lithographic master by electrophotographic technique.

Example 1

An electrophotographic master is employed having an electrophotographic coating on the surface of a paper base sheet formulated to contain 8 parts by weight of zinc oxide (Florence Green Seal No. 8) per 1 part by weight of resinous binder (E-104-03 of DeSoto Chemical Company). The electrophotographic coating is present in a coating weight of about 20 pounds per 3000 square feet of surface area of the base sheet.

The coated base sheet is imaged by conventional Electrofax process by first exposing the surface of the coated base sheet to corona discharge for introducing an electrostatic charge over the entire coated surface of the plate and then exposing the charged surface to a light pattern by photographic technique, reflex, or through a negative transparency whereby the charges are removed from the surface of the plate in the exposed portions but remain in the unexposed portions to provide a latent electrostatic image. The image is developed by a dry powder having a resinous base or by a liquid developer in which the powder is suspended in dilute dispersion and whereby the developing material is attracted to the latent electrostatic imaged portion and is fixed thereon by subsequent heat and the like to form an ink receptive, water repellent image on the surface of the electrophotographic coating.

The imaged plate is then wet with an aqueous solution containing 2% by weight zirconium sulfate, application being made by a cotton pad wet with the solution or by dipping the plate into the solution or by spray coating or roller coating techniques.

The plate can be mounted on the cylinder of a conventional lithographic duplicating machine for the production of multiple copies by the conventional procedure of first wetting the surface of the plate by aqueous medium or repellent to wet out the treated non-imaged portions of the plate and then with greasy ink which is taken up by the water repellent, ink receptive imaged portions of the plate for copy reproduction.

Multiple copies can be produced without the tendency of scum formation on the non-imaged portions of the plate or without toning effects.

Example 2

A plate is imaged as in Example 1 and the imaged plate is wash coated with an aqueous solution containing 1% zirconium nitrate and 1% zirconium acetate.

More than one hundred copies of good quality are produced from the plate by conventional lithographic duplicating processes without noticeable toning or scumming in the non-imaged areas.

Example 3

A plate is imaged as in Example 1 and the imaged plate is wet by swabbing with a 2% solution of any one or a mixture of salts including zirconium hydroxy chloride, zirconium lactate, zirconium chloride, zirconium acetylacetonate, titanium sulfate, titanium lactate, and titanium potassium oxalate.

The resulting plates can be mounted on a conventional lithographic press for production of multiple copies by lithographic technique with little, if any, scumming or toning in the non-imaged portions.

Example 4

An Addressograph Multigraph "Series 2002" master imaged by electrophotographic technique is washed with a 1% solution of ammonium zirconyl carbonate. The plate can be mounted on the press and used immediately for the production of multiple copies by conventional processes of lithographic duplication to produce copies which are clean, tone-free, and free of scum in the non-imaged portions.

Example 5

An Apeco electrostat master having an electrophotographic coating of zinc oxide and resin is imaged by conventional electrostatic technique. The imaged plate is swabbed with a cotton pad wet with a 2% solution of zirconyl hydroxy nitrate and run immediately on a lithographic press to produce multiple clean copies.

In the foregoing examples, the conversion solution can be allowed to dry on the surface of the plate but the plate should be wet out with a conventional lithographic plate etch before running on the lithographic press to produce multiple copies.

It will be understood from the foregoing that the conversion to produce an imaged lithographic master does not depend for image development by electrophotography on electrostatic technique. For example, a lithographic plate having a coating of zinc oxide and a hydrophobic resinous binder can be imaged by other techniques, such as by direct imaging with an oleophilic writing material formulated in an ink composition, writing pencil, wax crayon, typewriter ribbon, transfer coating and the like, to produce an image directly on the surface of the coating, or such image may be produced by diffusion transfer to form a silver image. The plate imaged in the manner described can be treated with the conversion solution of this invention to convert the surfaces of the non-imaged portions whereby the latter become water receptive and ink repellent while the imaged portion remains ink receptive and water repellent to provide a workable imaged lithographic plate from which multiple clean copies can be produced. Under these circumstances, it will be apparent that the zinc oxide need not be the special zinc oxide used in the electrophotographic coatings.

It will be further understood that the described coating of zinc oxide and resinous binder may be provided on any suitable base sheet such as paper, metal, plastic film and the like without departure from the spirit of the invention.

It will be understood that other changes may be made in the details of construction, arrangement and operation, without departing from the spirit of the invention, especially as defined in the following claims.

I claim:

1. In the method of producing an imaged lithographic master in which the surface has an image of a water repellent, ink receptive imaging material on an underlying coating of zinc oxide in a water repellent, water insoluble binder, comprising the step of wetting the imaged surface of the master with an aqueous solution of a water soluble salt of a cation selected from the group consisting of zirconium and titanium and an anion selected from the group consisting of sulphate, nitrate, chloride, hydroxy nitrate, hydroxy chloride, acetate, lactate and tetraacetyl acetonate whereby the surfaces in the non-imaged portions of the master become ink repellent and water receptive while the imaged portion remains ink receptive and water repellent and in which the salt is present in an amount within the range of 0.1 to 10 percent by weight.

2. The method as claimed in claim 1 in which the solution contains the water soluble salt in a dissolved state in an amount within the range of 0.5 to 4 percent by weight.

3. In the method of producing an imaged lithographic master in which the surface has an image of a water repellent, ink receptive imaging material on an electrophotographic coating of zinc oxide having a photoconductivity of at least $10^{-9}$ ohm$^{-1}$/square/watt/cm.$^2$ and a water insoluble, water repellent binder having a high dielectric constant and high dielectric strength, the steps of wetting the imaged surface of the master with an aqueous solution containing the ions of a metal selected from the group consisting of zirconium and titanium whereby the surfaces in the non-imaged portions become ink repellent and water receptive while the imaged portion remains ink receptive and water repellent.

4. In the method of producing an imaged lithographic master in which the surface has an image of a water repellent, ink receptive imaging material on an electrophotographic coating of zinc oxide having a photoconductivity of at least $10^{-9}$ ohm$^{-1}$/square/watt/cm.$^2$ and a water insoluble, water repellent binder having a high dielectric constant and high dielectric strength, the step of setting the imaged surface with an aqueous solution of a water soluble salt of a cation selected from the graup consisting of zirconium and titanium and an anion selected from the group consisting of sulphate, nitrate, chloride, hydroxy nitrate, hydroxy chloride, acetate, lactate and tetraacetyl acetonate whereby the surfaces in the non-imaged portion become ink repellent and water receptive while the imaged portion remains ink receptive and water repellent and in which the salt is present in an amount within the range of 0.1 to 10 percent by weight.

5. The method as claimed in claim 4 in which the water soluble salt is present in the dissolved state in an amount within the range of 0.5 to 4 percent by weight.

6. In the method of producing a lithographic master by electrophotographic technique using a base sheet having a continous electrophotographic coating of zinc oxide in a water insoluble, water repellent binder having a high dielectric constant, the steps of charging the surface of the coating by corona discharge to provide an overall electrostatic charge on the surface, exposing the charged surface to a light pattern containing the image whereby the electrostatic charge is destroyed in the exposed portions and retained in the unexposed portions to provide a latent electrostatic image on the surface of the coating, developing the image with a developing material containing an ink receptive, water repellent imaging material, fixing the developed image onto the surface of the coating, and then wetting the surface with an aqueous solution containing the ions of a metal selected from the group consisting of zirconium and titanium whereby the surfaces in the non-imaged portion become ink repellent and water receptive while the imaged portion remains ink receptive and water repellent.

7. The method as claimed in claim 6 in which the aqueous solution comprises a solution of a water soluble salt of a cation selected from the group consisting of zirconium and titanium and an anion selected from the group consisting of sulphate, nitrate chloride, hydroxy nitrate, hydroxy chloride, acetate, lactate and tetraacetyl acetonate and present in an amount within the range of 0.1 to 10 percent by weight.

8. The method as claimed in claim 7 in which the water soluble salt is present in the solution in an amount within the range of 0.5 to 4 percent by weight.

References Cited

UNITED STATES PATENTS

| | | | |
|---|---|---|---|
| 2,952,536 | 9/1960 | Kurz | 96—1 |
| 3,020,839 | 2/1962 | Richard | 101—462 X |
| 3,133,498 | 5/1964 | Michalchik | 96—1 X |
| 3,160,506 | 12/1964 | O'Connor et al. | 96—33 |
| 3,196,785 | 7/1965 | Eissler | 96—33 X |
| 3,231,376 | 1/1966 | Sorkin et al. | 96—33 |
| 3,256,810 | 6/1966 | Ensink | 101—462 X |
| 3,272,121 | 9/1966 | Uber et al. | 96—1.8 X |
| 3,309,990 | 3/1967 | Klupfel et al. | 101—457 X |

J. TRAVIS BROWN, *Primary Examiner.*

C. E. VAN HORN, *Assistant Examiner.*

U.S. Cl. X.R.

101—457, 462